United States Patent [19]

Bleeke

[11] Patent Number: 4,479,107
[45] Date of Patent: Oct. 23, 1984

[54] PRECISION LINEAR POTENTIOMETER SENSOR

[75] Inventor: William F. Bleeke, North Webster, Ind.

[73] Assignee: CTS Corporation, Elkhart, Ind.

[21] Appl. No.: 444,181

[22] Filed: Nov. 24, 1982

[51] Int. Cl.³ ............................................ H01C 10/38
[52] U.S. Cl. .................................. 338/176; 338/183; 338/184; 338/195; 338/199
[58] Field of Search ............... 338/176, 180, 181, 183, 338/184, 188, 199, 164, 195; 29/610 R

[56] References Cited

U.S. PATENT DOCUMENTS

| | | | |
|---|---|---|---|
| 2,922,977 | 1/1960 | Gottschall | 338/183 |
| 3,392,360 | 7/1968 | Guggenheim et al. | 338/176 |
| 4,053,865 | 10/1977 | Brown, Jr. | 338/180 |
| 4,172,248 | 10/1979 | Okuya | 338/176 |
| 4,251,796 | 2/1981 | Soeda et al. | 338/176 |

*Primary Examiner*—C. L. Albritton
*Attorney, Agent, or Firm*—Rodger H. Flagg

[57] ABSTRACT

A potentiometric linear position sensor including a housing (10) made of extruded aluminum which may be cut to preferred lengths (15). The sensor includes a Kapton film substrate (32) having first a uniform coating of resistive material (34) disposed thereon, and then distinct islands formed by laser sculpting. Conductive material (50, 53, 55, 56, 57, 58), screen printed upon the resistive material before or after the laser sculpting, is connected to terminal means (62, 68, 70) for the respective electrical elements (48, 51, 55). The flexible Kapton film substrate (32) is inserted endwise into the housing (10) with the side edges of the substrate curled upwardly and captured within longitudinal housing slots (28, 29) disposed along opposite housing walls (14, 16). The housing (10) is sealed by end closure means (60, 90), one closure means (60) having the termination means (62, 68, 70) connected to conductive paths (53, 56, 60) disposed on the respective electrical elements (48, 51, 55), and the other end closure means (90) providing securement for an extension spring (104) and journalling for a shaft (116) attached to a combination slider-and-contactor (76, 77) disposed within the housing. Displacement of the shaft (116) stretches the extension spring (104) and effects a corresponding longitudinal movement of the contactor (77) along the resistive element (48) and collector path (51). An alternative embodiment includes an exterior magnetic actuator (134) located exteriorly of the housing (10) and coupled magnetically with the interiorly disposed slider (176) for movement therewith.

10 Claims, 9 Drawing Figures

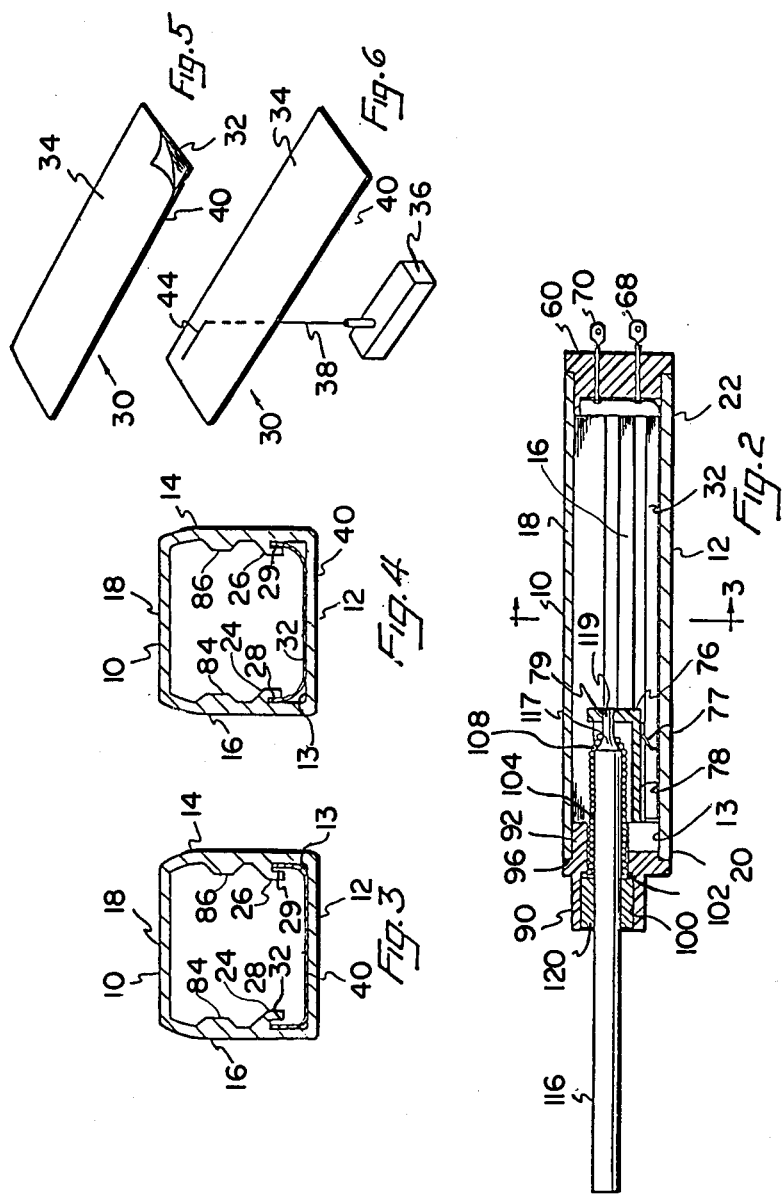

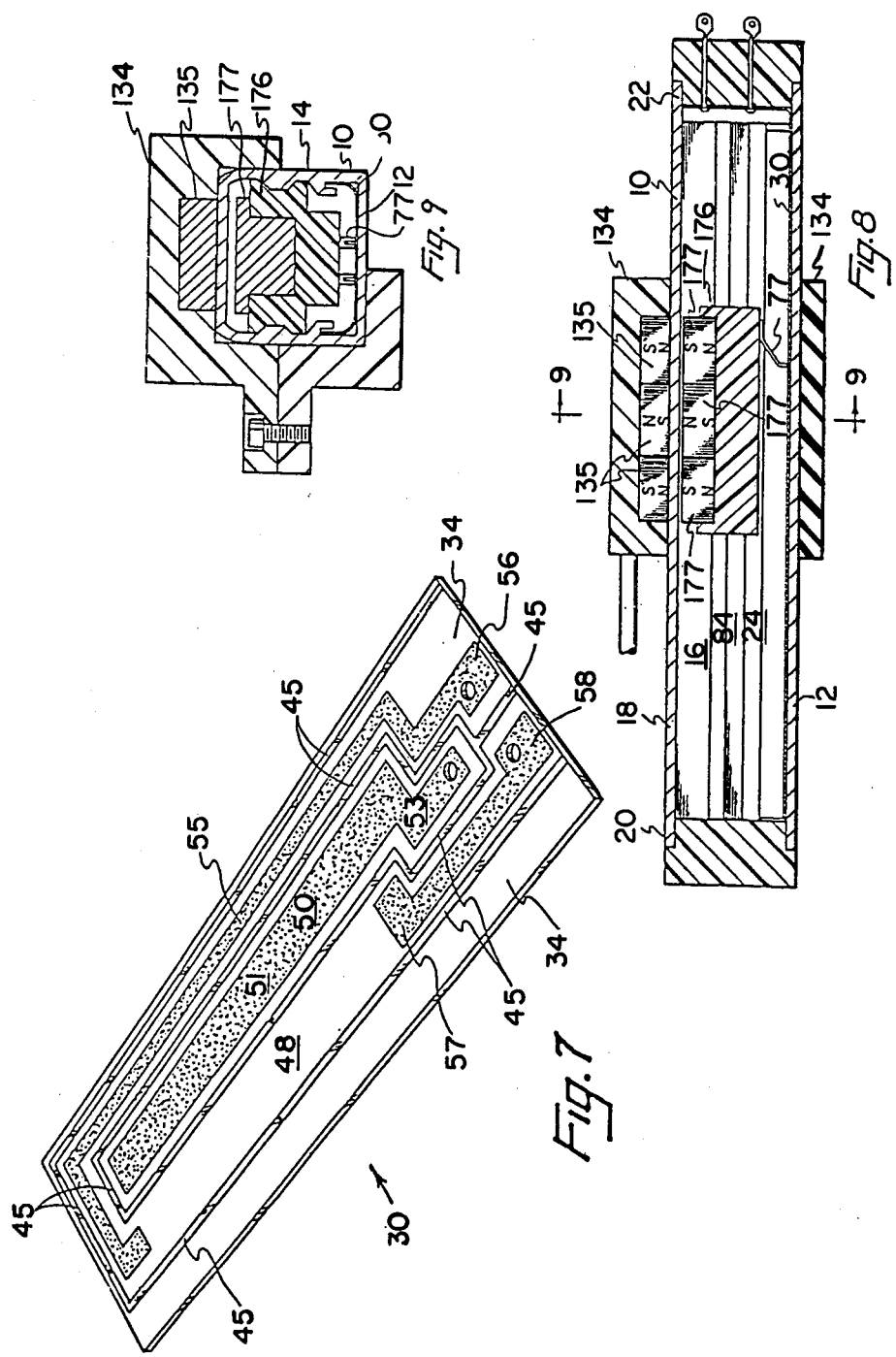

PRECISION LINEAR POTENTIOMETER SENSOR

DESCRIPTION

1. Technical Field

This invention relates to a linear potentiometer sensor in which the active element of the potentiometer is constructed on a flexible electrically inert substrate. The resistance path of the potentiometer is a laser sculpted, precisely configured construction having a uniform cross section, so that the potentiometer sensor has virtually instrument-precision capability. The sensor can be readily constructed of various sizes.

2. Background Art

A position responsive linear sensor of potentiometric configuration is quite old in the art. An example of this is U.S. Pat. No. 4,284,969 entitled "Potentiometer," inventor Victor Carbonneau, issued Aug. 18, 1981. In these prior art constructions, there is typically a slider having a contactor, the contactor engaging a resistance path and a conductor path. A change in voltage output is dependent upon a change in slider position relative to these paths. In each instance, the potentiometer acts as a mechanical transducer providing a change in voltage output as a function of change of slider position. Thus, a mechanical means and its operation provides a variable voltage output value. The different embodiments provided in the past, while serving to an extent the needs of the art, have nevertheless incorporated many shortcomings such as insufficient accuracy in the resistance path. In other words, the prior art overlooked the criticality of the resistance path and thus produced resistance paths nonuniform in cross section and outline so that it was difficult to accurately equate slider position and change of slider position with a change in potentiometric voltage output. If change in slider position is equated with change in voltage output and the resistor path itself varies in resistance value along its length when engaged by the wiper component of a slider, there will not be a uniform change in voltage output corresponding to a change in slider position. Moreover, it is highly desirable to provide different potentiometer sensors having a variation of sensitivities, i.e. for a given range of linear movement the contactor and resistor should effect a constant rate of change of voltage, but the slope in the rate of change should be a matter of design variability. Thus, the designer should have available a sensor in which the range of potentiometric sensor movement is variable. Frequently, changing the effective travel length for the slider necessitates a change in length for the housing. Such changes necessitate retooling which is undesirable. With a single set of tooling, it should be possible to change the effective range of movement of the slider and the sensitivity of the potentiometer while at the same time providing near instrument accuracy in position responsiveness to equate a change of position to a linear change in voltage output.

In addition to the foregoing needs of the prior art, there is a further need for an improved method of assembly and construction of a potentiometric linear position sensor in which the electrical element may consist of a flexible substrate such as Kapton or the like, electrically inert and serving as a substrate for a uniform coating of resistance material.

DISCLOSURE OF THE INVENTION

The present invention comprises a potentiometric linear position sensor. The sensor comprises a housing of extruded aluminum that may be constructed of variable length and cut to dimension. The active elements of the potentiometer are formed on an electrically inert substrate. The substrate may consist, by way of example, of Kapton. The Kapton is uniformly coated with a resistance material, the coating being developed by a mier rod application and after this uniform coating is developed, a laser beam is directed toward the uncoated side of the substrate to burn off linear paths and sculpting the surface of the resistance layer into two electrically isolated pathways, one the resistance and return path, and the second a collector. After these two "islands" are formed, conductive portions may be screened-on to provide for electrical connection of the resistive path to a terminal, define the collector path at a very low resistance value and provide for connection of the collector path to an output terminal, and further provide a low resistance electrical path as a return path for connection to an output terminal. Alternatively, the conductive portions may be applied prior to the laser sculpting.

The substrate with electrically isolated islands is inserted longitudinally into a housing of narrower width than the substrate so that the edges of the substrate curl upwardly along the interior side walls of the housing and are captured within longitudinal slots of the housing. The central portion of the Kapton element is forced to lie flatly against the interior base of the housing because of the force developed by the curled edges. The housing is enclosed except at its ends. A slider is disposed within the housing and has a contactor engaging the resistance and collector paths so that the position of the contactor determines the potentiometric linear position sensor voltage output. An extension spring may be used to return the slider to its initial position when biasing effort, which displaces the slider, is relieved.

The ends of the housing are sealed by a first closure member which includes terminals and by another closure which provides a slideable bearing for an externally operated rod operatively connected to the slider.

One of the important features of the present invention is that the Kapton substrate is flexible and variations in its width and in housing width are readily compensated for by flexing the substrate edges from a flat position to curled positions as they are fitted into the longitudinal internal slots of the housing. The main portion of the substrate which constitutes the central portion carrying the pathways, lies flat against the confronting internal flat surface of the housing. Variations in substrate and housing widths are readily accommodated for by either a large radius or small radius of flexed substrate sides force fitted into the longitudinal slots. Thus, the device, while highly accurate in its electrical functions, may be constructed of components which are not critical in their dimension, except the all important feature of having a highly uniform resistance path of uniform thickness and sculpted of precisely outlined dimensions.

Instead of being mechanically operative, the device can have its ends sealed and the slider magnetically coupled through the side walls of the housing with a magnetic slide actuator which moves longitudinally on the housing with the housing serving as a carrier for the magnetic slide actuator. All of the described functions contribute to a variability of design in the construction, provide a substantial range of voltage sensitivity, obviate extensive tooling for changes, and above all produce an instrument level accuracy in voltage output precisely reflective of change in position of the slider.

The described improvement in the method of assembly also offers substantial economies in the construction and usage of the device.

BRIEF DESCRIPTION OF THE DRAWINGS

FIG. 2 is a longitudinal section view taken along the longitudinal center line of the device;

FIG. 3 is a section view taken along lines 3—3 of FIG. 2 and illustrating one dimension for the Kapton substrate;

FIG. 4 is the same section view as illustrated in FIG. 3 but with a Kapton substrate of less width than that illustrated in FIG. 3;

FIGS. 5, 6 and 7 illustrate progressive views showing how the substrate in FIG. 5 is first coated with a uniform lamination of resistance material by a mier rod application; FIG. 6 illustrates the beginning of the sculpting of the "islands" that are electrically insulated from each other by the substrate and developed by linear "burning" away of the resistance material by a laser beam; FIG. 7 illustrates the completed sculpting of the "islands" and with screened-on conductive paths for the resistance path, the collector path, and the return path, respectively;

FIG. 8 illustrates in longitudinal cross section the magnetic polarities of a multipole slider displaceable by means of a multipole magnetic actuator mounted on the housing and movable longitudinally along the housing while magnetically coupled through the housing walls with the slider, and;

FIG. 9 is a section view along view line 9—9 of FIG. 8.

BEST MODE FOR CARRYING OUT THE INVENTION

Figure 1:
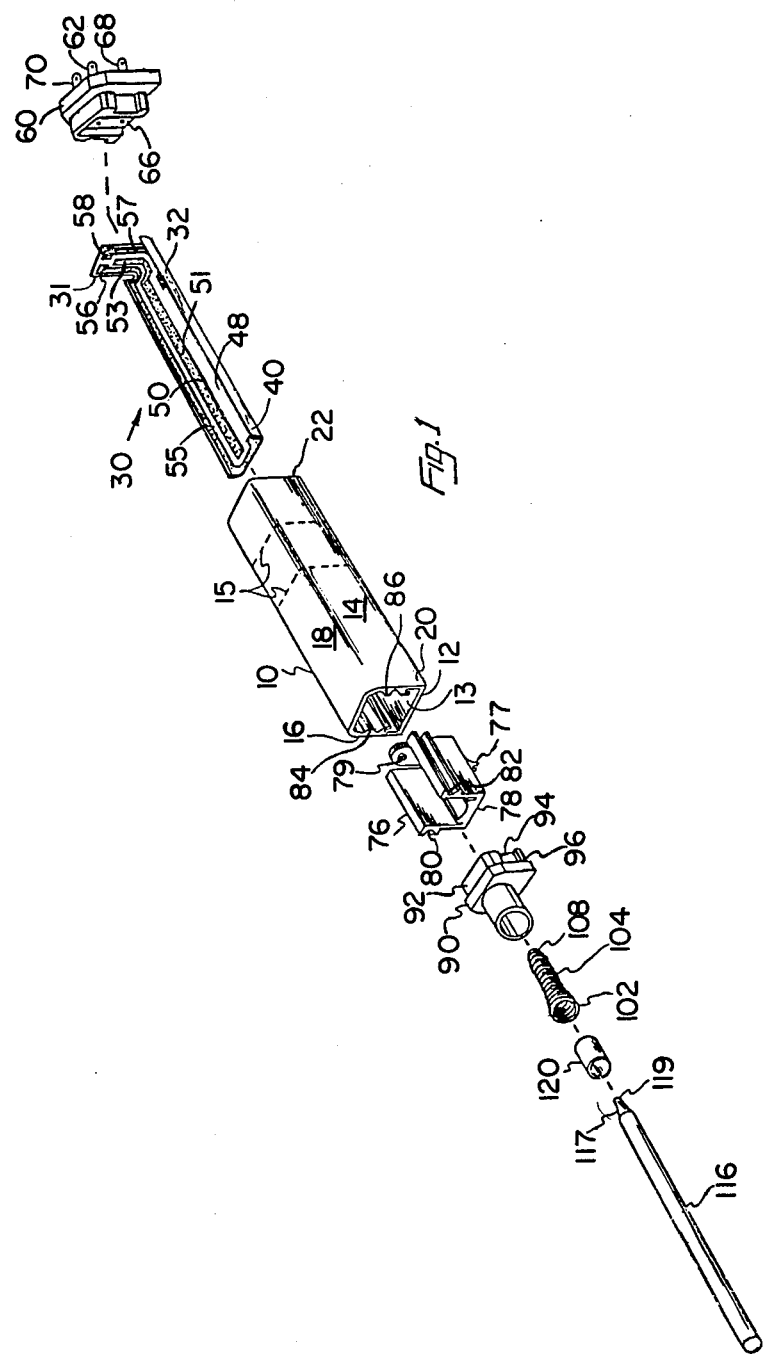
FIG. 1 is an isometric exploded detail view of the potentiometer and illustrates the components of the potentiometer.

Referring now to FIGS. 1-4, there is illustrated a housing 10 having a base 12, side walls 14 and 16, and upper wall 18. The housing forms an enclosure on four sides with the ends 20 and 22 being open. Within the housing side walls are two ribs 24 and 26 which form slots 28 and 29 extending the length of the housing. The active element of the potentiometer is designated generally by reference numeral 30 and consists of a Kapton substrate 32 which is electrically inert and has on its surface a uniform coating 34 (FIGS. 5-7) of resistance material obtained by meir rod application. The characteristic of this coating 34 is a uniformity of thickness from one end of the substrate to the other and from side to side. This is an important feature of the present invention as will be seen from a later part of this description. After the uniform coating 34 is applied to the substrate and conductive laminations applied to portions of the coating, the resistance coating 34 is sculpted by means of a laser 36 wherein a laser beam 38 is directed against the uncoated side 40 of the substrate 32 to burn away linear sections commencing in the manner designated by reference numeral 44 in FIG. 6. The final sculptured lines 45 are illustrated in FIG. 7.

Referring to FIG. 7, it can be seen that the laser beam described two continuous lines 45, the effect of which is to separate the resistance coating 34 into two distinct "islands" isolated one from the other by the transparent Kapton substrate. One sculpted island constitutes the resistance path 48 and the return path 55, and the second path a collector 51. Because the laser 36 can describe an island of precise formation, it should be noted that the island constituting the resistance path 48 has a precise dimension, i.e. its width is carefully dimensioned and precisely defined and this, together with the uniform thickness of the coating, produces a change in resistance that is linearly related to the position of a contactor member in slideable connection therewith (FIG. 2).

A conductor path 57 with path end 58 is screened onto resistance path 48 and connected electrically with terminal 62 in end cap 60 (FIG. 1). The end 31 of the element 30 is bent upwardly and fits within recess 66 of the end cap 62 (FIG. 1). A screened-on conductor lamination 50 provides a substantially resistance-free conductive path which forms the collector path 51 and the path end 53 is electrically connected to terminal 68 in end cap 60. The screened-on conductive 55 forms the return path and path end 56 is connected to terminal 70 in end cap 60. These conductive laminations may be applied to the uniform coating 34 of the resistance material either before or after the laser sculpting described above. It is preferable to apply the conductive laminations to the uniform coating 34 prior to laser sculpting so that no further printing is necessary after the sculpting.

Of the two described islands, the resistive path 48 and the collector path 51 are engaged by a contactor 77 (FIG.2) secured to the undersurface 78 of a slider 76.

Slider 76 has two longitudinal mounting slots 80, 82 interfitted with coacting ribs 84 and 86 of the housing 10 to provide free sliding movement for the slider (see FIG. 1).

End 20 of housing 10 is sealed by an end cap 90 having a mounting boss 92 fitting within open end 20 and notches 94 embracing the ribs 84, 86. The outer circumference of boss 92 is press fitted into the interior of the open end 20 until shoulder 96 encloses end 20. Within end cap 90 is a stepped recess 100 (FIG. 2) which captures the large end coil 102 of extension spring 104 and the smaller or reduced end coil 108 is captured over the conical end 117 of a shaft 116. Shaft 116 is journalled in bearing 120 disposed in end recess 100. The reduced end 119 of the shaft 116 is fitted into an opening 79 of the slider 76 so that the slider together with its contactor 77 can be advanced to the right in FIG. 2 by forcing the external shaft 116 to the right and concurrently stretching the spring 104. It has been found that an extension spring is superior to a compression spring in that loading the spring by stretching obviates kinking of the coils which commonly occurs with a long excursion compression spring. Additionally, a compression spring underload develops sideways or lateral forces on the slider to impede its movement. With an extension spring, the slider is advanced without any lateral forces exerted thereon and thus no sideways distortion factor is introduced, which minimizes side loading forces on the bearings.

ALTERNATIVE EMBODIMENT

Instead of mechanically advancing and retracting the slider 76, the ends 20 and 22 of the housing can be sealed and the slider magnetically coupled with a multipole magnetic actuator 134 (FIGS. 8 and 9) mounted on the housing 10. Thus, as the magnetic actuator 134 with multipole magnet 135 is moved to the right and to the left on the housing (see FIG. 8) which serves as a track for the magnetic actuator, the magnetically coupled slider 176, also having a multipole magnet 177, is caused to move concurrently with the magnetic actuator 134, thus accomplishing the same functional results as if the slider 76 were mechanically coupled with rod 116 in the manner previously described.

METHOD OF FABRICATION

The housing 10 starts out as extruded aluminum stock of whatever length is desired (as illustrated by dashed lines 15 in FIG. 1) and then is cut to length, without need for changing the tooling or fixtures with change in length of housing. It should be understood that the housing can be made of other materials such as plastics. Also, the range of resistance can be readily changed by simply varying the length or the volumetric resistance of the uniform coating 34 of resistance material 32 and thereby varying the sensitivity of the sensor.

The sensor has a high degree of accuracy because even though there may be a variation in voltage input, the change of voltage output, which is the parameter measured, is a function of the change of location of the contactor 77 on the resistance path 48. There is virtually no change in the thickness dimension of the resistance film 34 along the path of movement of the contactor 77. The width of the resistance path 48 is the same along the entire length of the path, thus the change in voltage is always proportional to the change of position of the contactor relative to the resistance path 48. This is achieved because of the precision in forming the outline for the resistance path, and because of the remarkably uniform thickness of the resistance material forming the resistance path. The change in voltage output is virtually instrument grade in spite of the fact that the device is manufacturable in variable size by such a ready manner.

The characteristics that contribute to and effect this degree of accuracy obtainable from production line techniques, are the flexible electrically inert substrate in the form of Kapton and the initial resistance coating applied by mier rod in the manner illustrated in FIG. 5, and the subsequent sculpting in the manner illustrated in FIG. 6 to produce the precise configurations of the resistance path, the collector path, and the return path. The assembly of the device is also readily achieved in that the flexible Kapton subcoating is drawn into position either by roller means or by other means, and any variation of substrate and housing widths is easily accommodated as illustrated in FIGS. 3 and 4 by either curling the substrate edges along a small diameter as shown in FIG. 3, or by effecting a larger radius if the Kapton substrate is narrower as in FIG. 4. In either event, the edges of the Kapton substrate are caused to curl and are captured within slots 28, 29 formed at the side walls of the housing 10.

Another important advantage of the present invention is that the central portion of the Kapton substrate 32, regardless of width variations, lies flat against the inner surface 13 of the base 12 as illustrated in FIGS. 3 and 4, because the curled edges bias the central portion into such engagement. Once the Kapton substrate, together with its active functional surfaces, is disposed in such flat condition, this provides the opportunity for the contactor to make a positive and flat surface-to-surfaced contact.

OPERATION

In operation, the shaft 116 is displaced toward the right (FIG. 2), stretching the spring 104 and displacing the slider 76 toward the right. As this occurs, contactor 77 moves along the surfaces of the resistance path 48 and collector path 51. Such change in position causes a change in voltage output, the voltage change occurring in a linear manner. That is, the change in voltage as a function of a change in position, is a linear relationship which is at all times proportional. The voltage change can occur along a linar path with a steep slope which indicates enhanced sensitivity; also, the rate of change can extend over a short stroke length or a substantial stroke length for the shaft 116 and its attached slider, depending upon the particular application.

In any event, the method of assembly together with the variability of length for the extruded aluminum housing which can be cut to a particular design, all combine to produce a sensor that is relatively inexpensive to fabricate, is readily adaptable to particular designs and applications, and above all has such accuracy in its response that it approaches, if not equals, instrument quality.

CONCLUSION

Although the present invention has been illustrated and descriged in connection with example embodiments, it will be understood that these are illustrative of the invention, and by no means restrictive thereof. It is reasonably to be expected that those skilled in the art can make numerous revisions and additions to the invention and it is intended that such revisions and additions will be included within the scope of the following claims as equivalents of the invention.

I claim:

1. A potentiometer comprising a flexible inert substrate having an accurately configured series of electrical elements thereon and which are isolated one from the other by said substrate, said elements having been effected by laser sculpting to produce an accurately defined resistance path and collector path, conductive material disposed on the isolated elements to provide electrical connections with respective termination means, a housing having longitudinally formed slot means disposed on opposite interior walls of said housing and receiving the curled edges of said substrate which has a width greater than the interior width of said housing, said housing providing a flat interior base which the substrate engages, and combination slider-and-contactor means movable longitudinally within said housing and with the contactor means engaging the resistor and collector paths to transduce the change in the longitudinal position of said slider to a voltage output.

2. The potentiometer in accordance with claim 1, further comprising resilient means operatively secured to said housing and shaft means receiving an end of said resilient means, said shaft means for effecting displacement of said slider-and-contactor means whereby the change in contactor position relative to said resistance path effects a change in voltage output.

3. The potentiometer in accordance with claim 1, further comprising magnetic actuator means disposed exteriorly of said housing and forming a magnetic coupling with said slider-and-contactor means.

4. The potentiometer in accordance with claim 1, further comprising end closure means for sealing ends of said housing and providing electrical connection with said electrical elements.

5. The potentiometer in accordance with claim 1, wherein the electrical elements have uniform thickness effected by mier rod application.

6. A linear position sensor, comprising a flexible electrically nonconductive substrate having a distinct laser sculpted electrical element thereon, said sculpted electrical element having uniform thickness effected by mier rod application and in electrical isolation with respect to other electrical elements, said sculpted electrical element comprising an electrical resistance path of uniform thickness and precise dimensions, the other elements comprising a conductive material coating forming a collector and an electrically conductive lamination forming a return path, a housing, and a slider means having contactor means in engagement with said resistance path and collector whereby a change in a longitudinal position of said slider means effects a change in output voltage.

7. The linear position sensor in accordance with claim 6, including resilient means, end caps for said housing, and shaft means connected to said slider means, said resilient means being fixedly secured at one end to an end cap and at the other end to said shaft means whereby displacement of the slider means by said shaft means effects yieldable extension of said resilient means and the slider means is returned to its initial position following displacement of said slider means.

8. The linear position sensor in accordance with claim 6, including a shaft operatively connected with said slider means and for effecting selective displacement of said slider means to transduce movement of the slider means to a change of output voltage.

9. The linear position sensor in accordance with claim 6, including end closure means sealingly enclosing the ends of said housing and a magnetic actuator disposed at the exterior of said housing and movable relatively to said housing, wherein said slider means is magnetically coupled with said magnetic actuator for movement therewith.

10. The linear position sensor in accordance with claim 9, in which said end closure means includes terminal means electrically connected with respective electrical elements.

* * * * *